INVENTORS
MITSUO TANAKA
KAZUO KANEKO
MASAO KAMIMURA

BY Craig & Antonelli
ATTORNEYS

INVENTORS
MITSUO TANAKA
KAZUO KANEKO
MASAO KAMIMURA

BY Craig & Antonelli
ATTORNEYS

INVENTORS
MITSUO TANAKA
KAZUO KANEKO
MASAO KAMIMURA

BY Craig & Antonelli
ATTORNEYS

INVENTORS
MITSUO TANAKA
KATSUO KANEKO
MASAO KAMIMURA

BY Craig & Antonelli

ATTORNEYS

INVENTORS
MITSUO TANAKA
KAZUO KANEKO
MASAO KAMIMURA

BY Craig & Antonelli

ATTORNEYS

INVENTORS
MITSUO TANAKA
KAZUO KANEKO
MASAO KAMIMURA

BY Craig & Antonelli

ATTORNEYS

INVENTORS
MITSUO TANAKA
KAZUO KANEKO
MASAO KAMIMURA

BY Craig & Antonelli
ATTORNEYS

United States Patent Office 3,530,481

Patented Sept. 22, 1970

3,530,481
ELECTROMAGNETIC HORN ANTENNA

Mitsuo Tanaka, Kokubunji-shi, Kazuo Kaneko, Hachioji-shi, and Masao Kamimura, Kodaira-shi, Japan, assignors to Hitachi, Ltd., Tokyo-to, Japan Filed Dec. 11, 1967, Ser. No. 689,564
Claims priority, application Japan, Jan. 9, 1967, 42/1,429
Int. Cl. H01q *13/00*
U.S. Cl. 343—786 11 Claims

ABSTRACT OF THE DISCLOSURE

The present invention relates to an improved electromagnetic horn antenna having an improved multiplex electromagnetic mode generating structure with a reactance compensable effect comprised by a projecting portion located adjacent to one end of a flaring part of the horn and connecting the horn to a wave guide providing an exciting electromagnetic wave, which projecting portion is of a configuration which renders it possible to decrease side-lobe level by use of the multiplex mode and at the same time to solve problems of impedance mismatching over a broad operating frequency range.

BACKGROUND OF THE INVENTION

This invention relates to an improved antenna, and particularly to an improved electromagnetic horn antenna.

It is well known that the horn antenna has widely been used since it is an antenna having a simply designed structure and a comparatively high gain in the microwave band. It is also well known that a Cassegrain antenna having a primary feed horn, a subsidiary reflector and a main parabolic reflector is useful because of its high gain and low noise temperature characteristics. Where the horn antenna is especially employed for the Cassegrain antenna it is generally desired that the constant phase surfaces in a radiation field of the horn antenna be shown as spherical surfaces in a so-called Fresnel zone of this antenna, and that the radiation field in this region should be formed as an axially symmetrical characteristics.

In contrast to the desired results mentioned above, it is well known that the conventional horn antenna, such as, for example, a conical horn antenna operating in the dominant $TE_{11}^0$ mode generally tends to have rather ellipsoidal shaped constant phase surfaces in its radiation pattern, and that the beam width and direction gain of this antenna are differently observed in accordance with the selected observing plane. In other words, if the electric plane (E-plane pattern and the magnetic plane (H-plane) pattern in the electromagnetic horn are compared to each other, it is found that a different beam width and a different side lobe level are observed.

Thus, employing the conventional horn antenna for the Cassegrain antenna produces the following disadvantages. Where the conventional horn antenna is employed for the primary feed horn of the Cassegrain antenna, the amount of electromagnetic energy which fails to strike the subsidiary reflector increases, and the spillover energy causes an apprecable increase in the side lobe level near the main beam, which leads to an increase in the antenna noise temperature especially when it is used in the low elevation angle. Furthermore, the constant phase surfaces in the exciting wave, which is reflected by a subsidiary reflector and excites a main reflector, are also not spherical because of the ellipsoidal shaped characteristic of a primary feed horn mentioned above, and this also results in a decrease in the antenna gain and an increase in the antenna noise temperature.

One solution to the problem relating to the non-axial symmetry of the radiation and the undesirable side lobe level has already been proposed, that is, a horn antenna operated in a dual mode, which antenna usually employs a discontinuity as the $TM_{11}^0$ mode generator. In such a horn antenna, it is possible to alter the radiation field pattern so as to have an approximately axially symmetrical radiation characteristic resulting in a decrease in the side lobe level to a certain degree. However, as will be explained hereinafter, there are still some disadvantages in this known arrangement, such as, for example, problems in impedance mismatching and in frequency band characteristics.

BRIEF SUMMARY OF THE INVENTION

It is therefore an object of the present invention to provide an improved antenna of the electromagnetic horn type. It is another object of the present invention to improve the radiation pattern of the antenna mentioned.

It is a further object of the present invention to provide an improved antenna of the type described having an axially symmetrical radiation pattern characteristic.

It is still another object of the present invention to suppress in an antenna of the type described the side lobe level thereof over a wide band of operating frequencies.

It is still a further object of the present invention to improve the impedance matching in the antenna mentioned.

It is still another object of the present invention to provide an improved antenna having a relatively simply designed construction.

It is still another object of the present invention to provide an improved paraboloidal reflector antenna having high efficiency and low noise temperature by using the horn mentioned above as a primary feed horn.

These and other objects, advantages, and novel features of the present invention will be more apparent from the following detailed description when taken in connection with the accompanying drawings, and wherein.

Figure 4A:
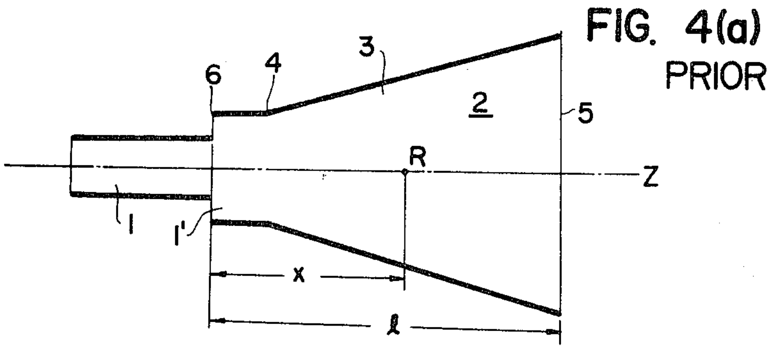
FIG. 4(a) PRIOR ART
Figure 4B:
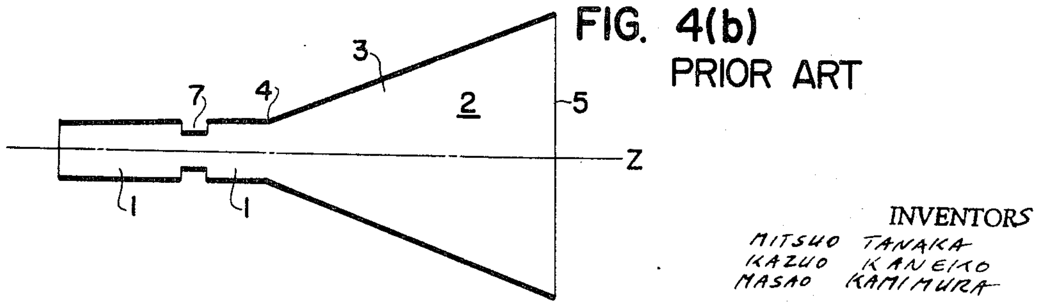
FIG. 4(b) PRIOR ART
Figure 4C:
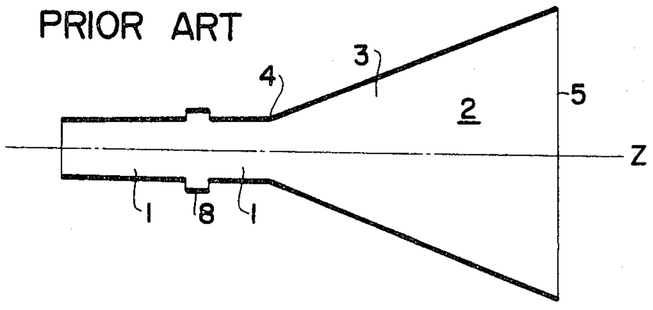
Figure 5:
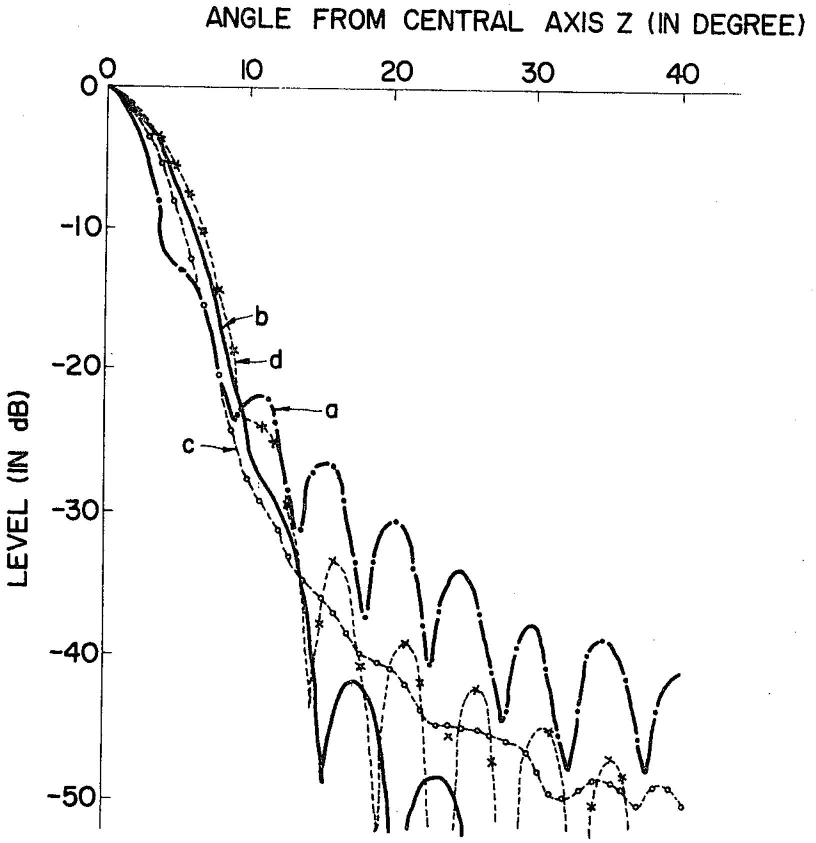
Figures 6A, 6B, 6C:
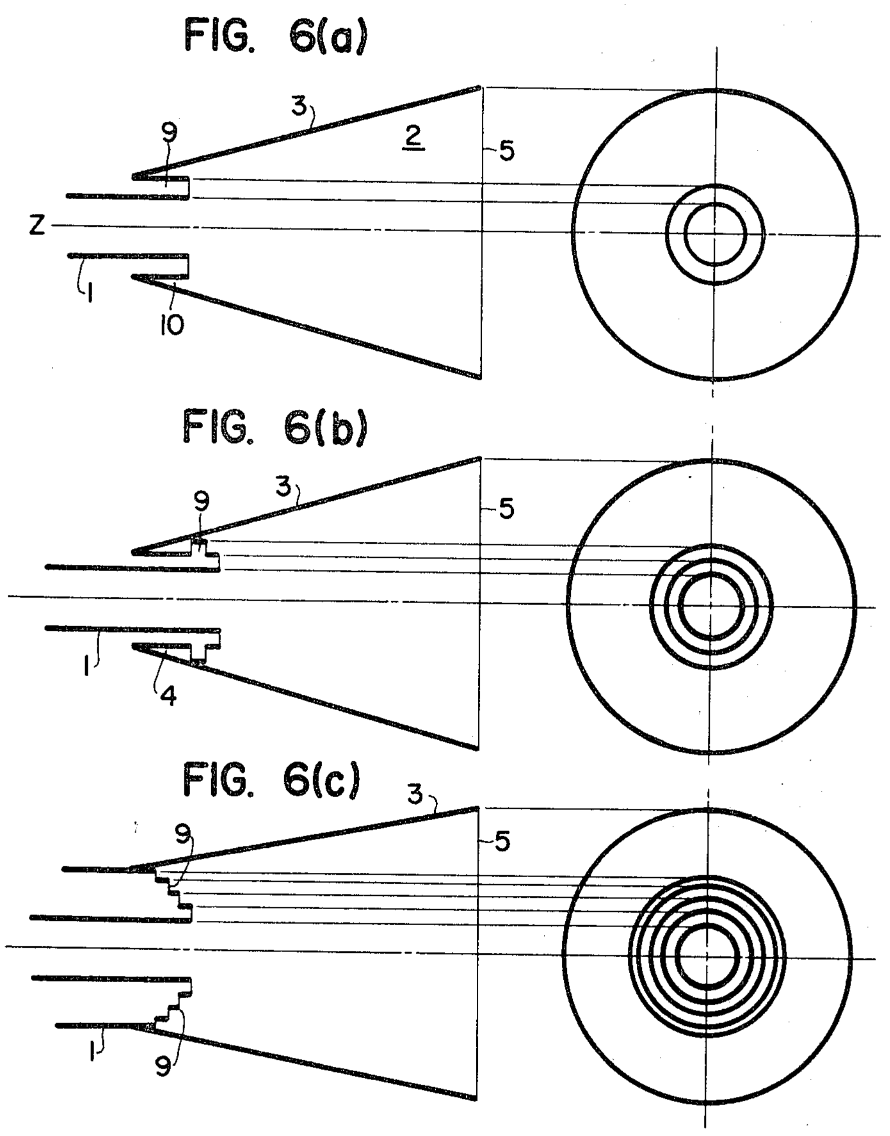
Figures 6D, 6E, 6F:
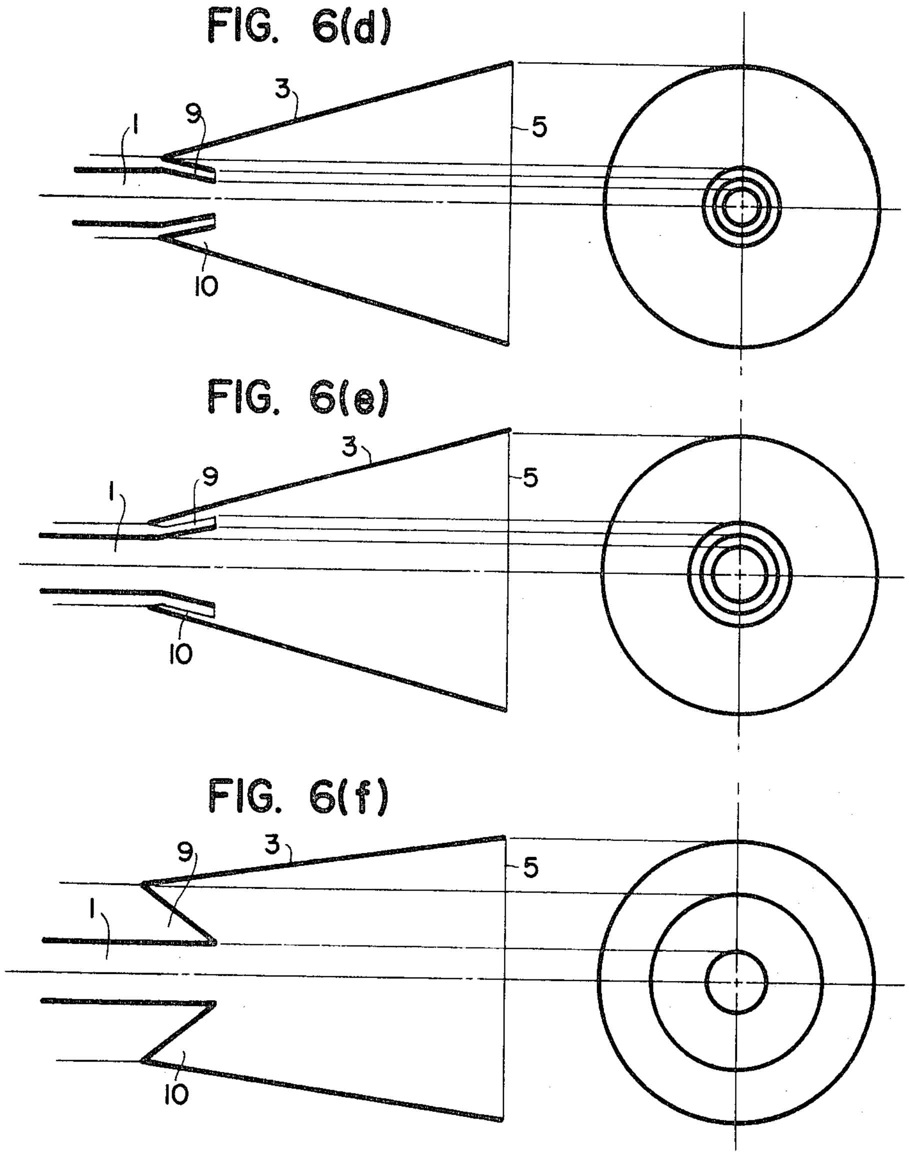
Figure 6G:
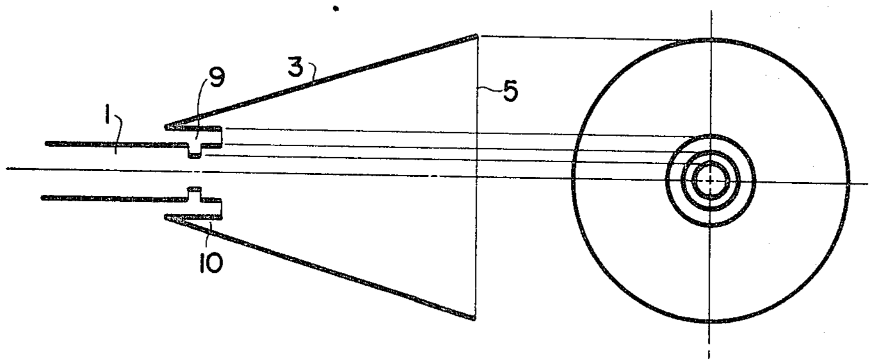
Figure 6H:
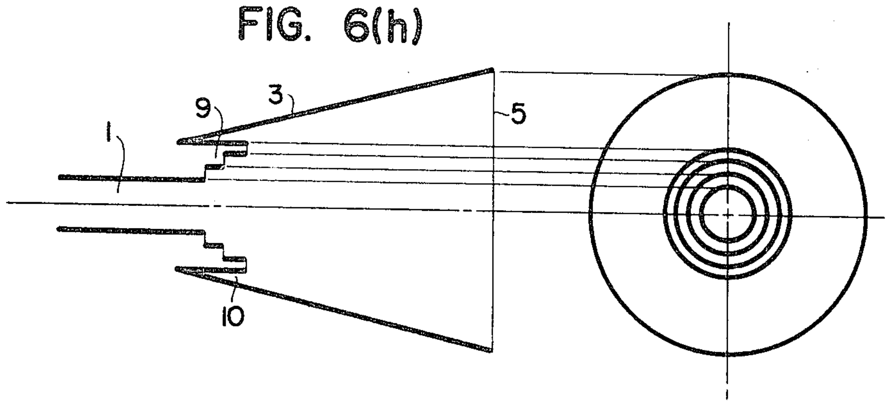
Figure 6I:
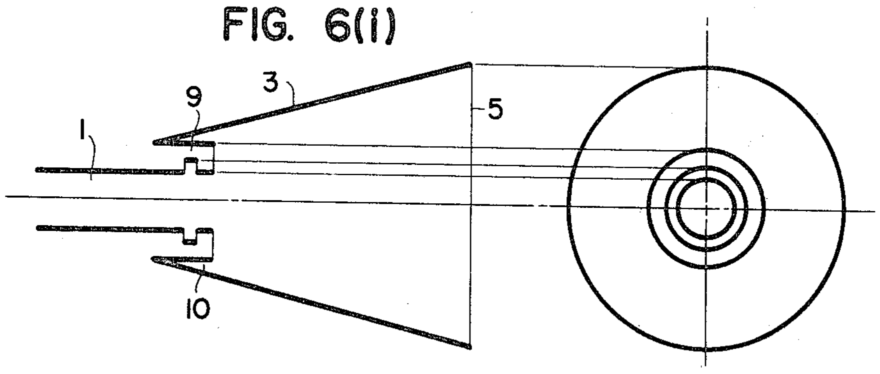
Figure 6J:
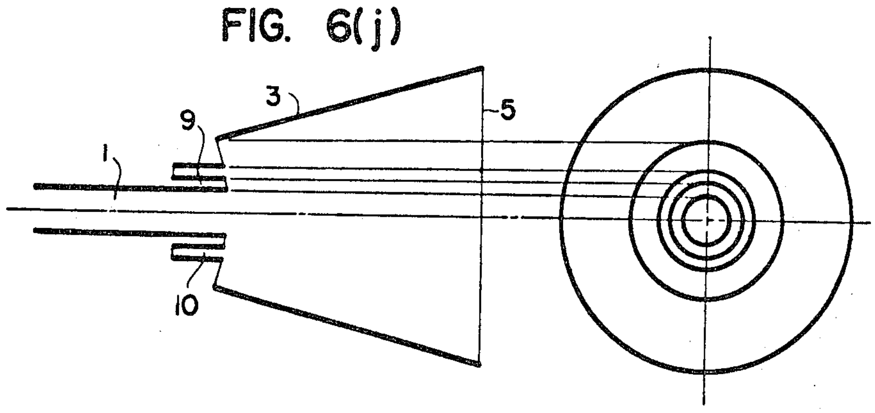
Figure 7:
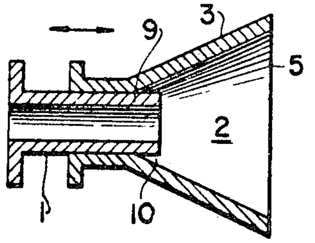
Figure 8:
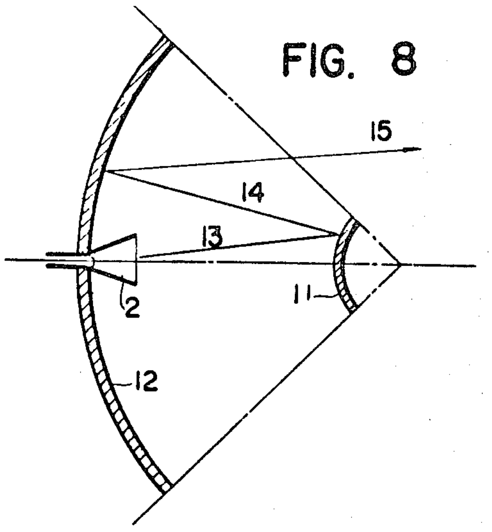

FIGS. 4(*a*), 4(*b*) and 4(*c*) show side schematic views of the prior art antennas made to be driven by the dual mode composed of the modes $TE_{11}^0$ and $TM_{11}^0$;

FIG. 5 shows a graph of an E-plane radiation pattern illustrating the electric field formed corresponding to driving phase difference thereof in both $TE_{11}^0$ mode and $TM_{11}^0$ for the antennas of FIGS. 4(*a*), 4(*b*) and 4(*c*);

FIGS. 6(*a*) to 6 (*i*) and FIG. 7 show side and front schematic elemental views of the antenna modified in accordance with the invention; and FIG. 8 shows a schematic side view of another embodiment in accordane with the invention.

DESCRIPTION OF THE PREFERRED EMBODIMENTS

Figure 1:
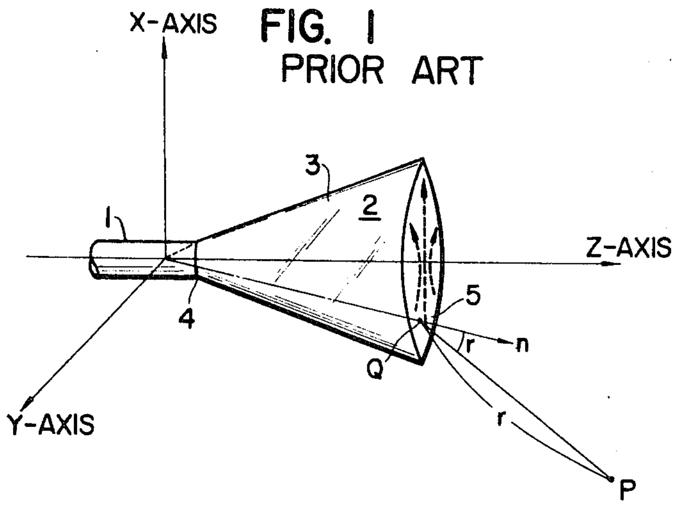
FIG. 1 PRIOR ART
FIG. 1 shows a schematic perspective view of the electromagnetic conical horn antenna in accordance with the prior art.
Figure 2:
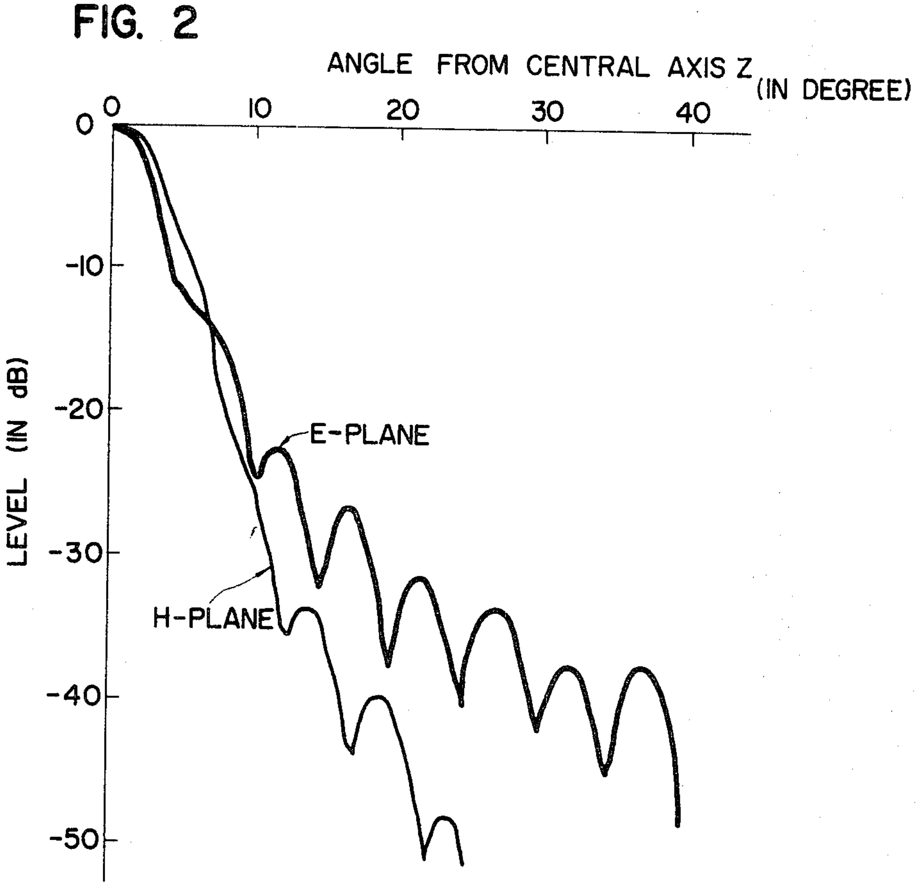
FIG. 2 shows a graph of a radiation pattern illustrating the relationship between the electric plane (E-plane) and the magnetic plane (H-plane) produced by the antenna in FIG. 1.

Referring now more particularly to FIGS. 1 and 2 which show, respectively, a perspective view of a prior art antenna structure and a graph of a radiation pattern produced by that anenna structure, a waveguide 1 feeds electromagnetic energy to a horn 2 having a flaring portion 3 extending smoothly and continuously from its throat 4 connected to the waveguide 1, to an aperture 5 in the direction of an axis thereof. An electric field distribution in the horn aperture 5 excited by the $TE_{11}^0$ mode in a circular waveguide is represented schematically in dotted line in the figure.

A radiation pattern of the antenna of FIG. 1 is shown in FIG. 2. It can be seen from FIG. 2 that the radiation pattern in the E-plane is different from that in the H-plane in both beam width and side lobe level. A comparison between the E-plane formed in the X–Z plane in FIG. 1 and the H-plane formed in the Y–Z plane in FIG. 1 indicate that the side lobe level in the E-plane is higher than the one in the H-plane and the main beam in the E-plane is narrower than the one in the H-plane. In addition, it is known that the radiation pattern is formed as an ellipsoidal surface instead of a more desirable spherical surface. As previously stated, it should be understood that such a horn provides a relatively low antenna gain and less noise performance because of the ellipsoidal surface characteristic and high side lobe level in the E-plane thereof.

Figure 3:
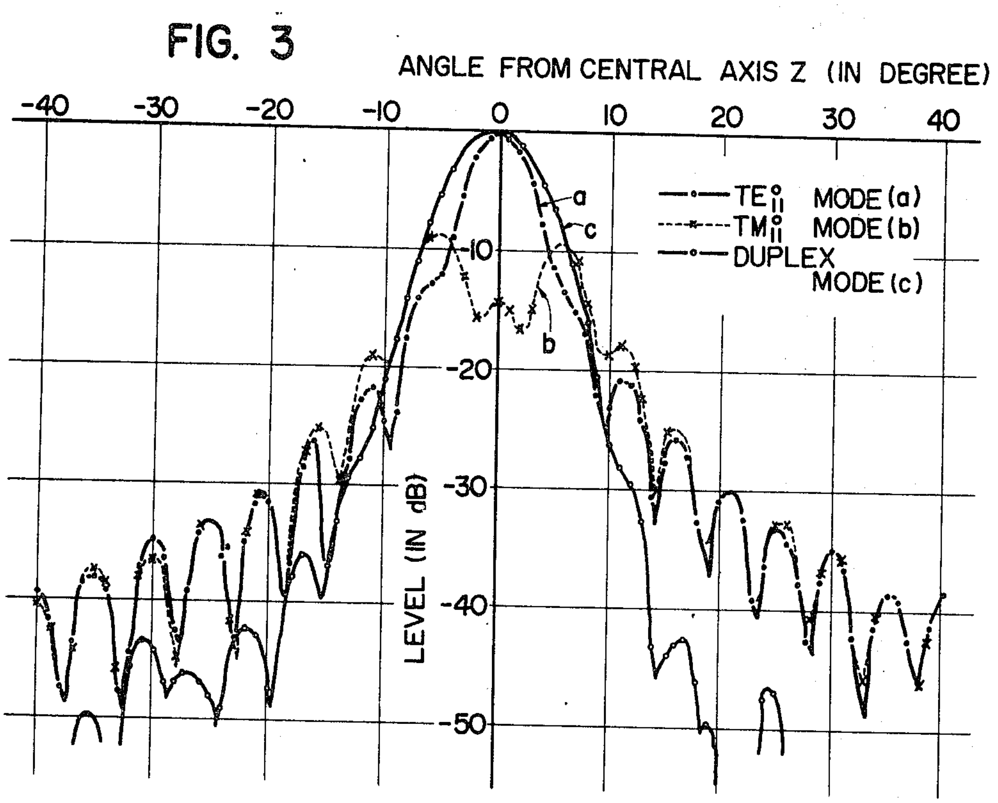
FIG. 3 shows a graph of an E-plane radiation pattern of the antenna which is excited by the signal $TE_{11}^0$ mode and dual mode composed of the $TE_{11}^0$ and $TM_{11}^0$ modes in the optimum mode ratio.

Referring now to FIG. 3, there is shown an amplitude pattern illustrating an electric plane produced by an antenna excited by a single ($TE_{11}^0$) mode and a duplex ($TE_{11}^0$ and $TM_{11}^0$) mode. A solid line (*a*) shows the radiation pattern produced by the horn excited by the single $TE_{11}^0$ mode, a dotted line (*b*) shows the radiation pattern excited by a single $TM_{11}^0$ mode, and a solid line (*c*) shows the radiation pattern excited by the duplex ($TE_{11}^0$ and $TM_{11}^0$) mode. The radiation pattern produced by the horn antenna excited by the duplex mode as indicated by solid line (*c*), has characteristics composed of a vector sum of the amplitude radiation pattern excited by both the single $TE_{11}^0$ mode (solid line *a*) and the single $TM_{11}^0$ mode (dotted line *b*), and the radiation pattern excited by the duplex mode, as shown in the line (*c*) of FIG. 3, can be shown as an axially symmetrical radiation pattern having a low side lobe characteristic. As a result, it is apparent that the duplex mode provides more desirable and advantageous results than the use of single $TE_{11}^0$ mode.

Referring now to FIGS. 4(*a*) to (*c*), there are shown side schematic views of several conventional antennas, with which a duplex mode may be generated. The horn antenna shown in FIG. 4(*a*) has a step 6 serving as an axially symmetrical discontinuity to generate the $TM_{11}^0$ mode in the horn, and the discontinuity is placed in waveguide portions 1 and 1'. The horn antennas shown in FIGS. 4(*b*) and (*c*) have an iris 7 and groove 8, respectively, serving as an axially symmetrical discontinuity to generate the $TM_{11}^0$ mode and both the iris 7 and the groove 8 are placed in waveguide portions 1 and 1'. While these known antenna arrangements have satisfactorily solved certain problems previously encountered through the generation of a duplex mode, they still exhibit disadvantages relating to side lobe level, antenna gain and operating frequency bandwidth, as will now be described in greater detail.

Another problem occurring in prior art devices relates to phase differences between the generated modes. Referring to FIG. 5, there is shown a plurality of radiation amplitude patterns by which the effect of the phase difference between the $TE_{11}^0$ mode and the $TM_{11}^0$ mode executed in the horn can be determined. A line (*a*) shows the radiation amplitude pattern for a case wherein a single ($TE_{11}^0$) mode is excited in the horn; line (*b*) shows the case where a duplex ($TE_{11}^0$ and $TM_{11}^0$) mode having an optimum phase difference between the $TE_{11}^0$ and the $TM_{11}^0$ mode is excited in the horn, a line (*c*) shows the case where a duplex mode having the $TM_{11}^0$ mode differ by 10° from the optimum phase difference with the $TE_{11}^0$ mode, is excited in the horn and line (*d*) shows the case where a duplex mode having the $TM_{11}^0$ mode differ by −20° from the optimum phase difference with the $TE_{11}^0$ mode is excited in the horn. It is therefore apparent from FIG. 5 that the side lobe level, under such condition wherein the horn is excited in the duplex ($TE_{11}^0$ and $TM_{11}^0$) mode, is about 10 db lower than the condition wherein the horn is excited in the single ($TE_{11}^0$) mode, and the frequency band width in accordance with the radiation pattern may be defined as the frequency band width having a phase difference within the optimum phase difference of ±20°.

The phase difference in electric angle is given by Equation 1

$$\Delta\phi = 360\int_0^l \left(\frac{1}{\lambda_g(TE)} - \frac{1}{\lambda_g(TM)}\right)dx$$

where $\Delta\phi$ is the phase difference between the $TE_{11}^0$ and the $TM_{11}^0$ mode at a point R shown in FIG. 4(*a*), $\lambda_g(TE)$ is the wave length in the waveguide of the $TE_{11}^0$ mode, $\lambda_g(TM)$ is the wave length in the waveguide of the $TM_{11}^0$ mode, $x$ and $e$ represent, respectively, the distance from the place of the discontinuity to the point R and the distance to the aperture plane 5 on the Z axis, as shown in FIG. 4. Thus, by the above Equation 1, the frequency band width in accordance with the radiation pattern is obtained as the phase difference having the optimum phase difference ±20°, as defined above. Where a conical horn antenna for example, which has 12.3 mm. as diameter of the waveguide, $2x=6°30'$ as a vertical angle of the horn, 80 mm. as diameter of the aperture is to be employed, the frequency band width thereof may be obtained as 45 to 50 gHz. under an optimum design.

Referring now to FIG. 4(*a*) again, since the $TM_{11}$ mode is generated at the place of the step or discontinuity 6, which has no variable dimension in the direction of the Z axis, the phase difference between the $TE_{11}^0$ mode and the $TM_{11}^0$ mode corresponding to a given operating frequency may not be varied at the step 6, which is one disadvantage with this known arrangement. The phase difference, however, may be varied in accordance with the operating frequency because the wave length in the waveguide and the horn is different for the two modes.

In this conventional art, however, difficult problems have been encountered both in generating a suitable duplex mode having an optimum phase difference between components in the dual mode and in impedance mismatching caused by the changes of the phase difference in each mode according to the changes of the operating frequency. The former problem is due to the rigid construction of the arrangement wherein the position of the discontinuity, such as step 6, iris 7 and groove 8 shown in FIGS. 4(*a*), 4(*b*) and 4(*c*), has been fixed and cannot be adjusted, making phase adjustment possible only by varying the operating frequency. However such adjustment does not make possible an increase in the frequency band width of the horn. In general, the frequency band width in accordance with the radiation pattern of the horn antenna can be used as a parameter which provides a figure of merit thereof. The latter problem results from the fact that the construction is not compensable for the changes of the phase difference in every mode according to the operating frequency as the operating frequency is varied to adjust for changes in phase.

Therefore, in this conventional horn arrangement, there have been unavoidable disadvantages which are produced by the horn with the fixed discontinuity resulting in increasing the transmission loss somehow and a decrease in the operable frequency band width thereof. As indicated above, the side lobe level in the prior art cannot be decreased to a value less than the value already achieved, and the frequency band width cannot be increased significantly beyond the normally expected value.

The present invention has one of its principle features in an antenna structure in which said disadvantage of the conventional antenna as described above, are overcome, and in fact that the new horn antenna may be simply constructed. Referring now to FIG. 6(*a*) there is shown one embodiment constructed according to this invention. The antenna comprising a waveguide 1 supplying exciting electromagnetic energy is connected to an electromagnetic horn 2 flaring smoothly and continuously outward in the direction of the axis Z thereof from its throat connected to the waveguide 1 to the aperture 5. A multiplex mode generating part, such as projection part 9, has been placed in position as the connecting part of the waveguide and the horn.

At the projecting part 9, there is produced a multiplex mode which includes a $TE_{1n}{}^0$ mode, a $TM_{1n}{}^0$ mode and the like, and such multiplex mode can easily be generated by exciting with a dominant mode, for example, $TE_{11}{}^0$ at the projecting part having an axially symmetrical discontinuity in the dominant mode transmission. Thus, in contrast to the single mode or the duplex mode provided in known arrangements, the invention employs a multiplex mode which is useful for improvement of the side lobe level for forming the axially symmetrical radiation pattern, and for producing a phase compensator or impedance matching means. The $TM_{1n}{}^0$ mode component of the multiplex mode is mainly effective for improvement of side lobe level in the E-plane and the $TE_{1n}{}^0$ mode component is mainly useful for improvement of the side lobe level in the H-plane.

The radiation field produced by the horn excited in the multiplex mode is given by Equation 2:

$$\dot{E}_{\mathrm{pf}}=\frac{jk}{4\pi}\Sigma\int s(\dot{E}_{\mathrm{ATE}}+\dot{E}_{\mathrm{ATM}})(1+\cos\gamma)\frac{e^{-jk\gamma}}{\gamma}\,ds$$

where S in the area of the aperture 5 of the electromagnetic horn, $j=\sqrt{-1}$, $K=2\pi/\lambda$ where $\lambda$ is a wave length, $\dot{E}_{ATE}$ is the electric field vector component in the $TE_{1n}$ mode $\dot{E}_{ATM}$ is the electric field vector component in the $TM_{1n}$ mode, $\gamma$ is a distance between point Q on the aperture 5 and the observing point P shown in FIG. 1, $\gamma$ is angle between the normal line $$N(=\overrightarrow{OQ})\text{ and line }\overrightarrow{PQ}$$

as shown in FIG. 1, O being an apex of the horn.

As mentioned above, the multiplex mode is produced at the projecting part 9 by exciting with the $TE_{11}{}^0$ mode in the waveguide 1, and the multiplex mode transmitted through the horn 2 is radiated from the aperture 5 to outerspace. In this case, the projecting part 9 serves as the multiplex modes generating part and is formed as a transition part between the end part of the wave guide 1 and the flaring section of the horn 2 in such a way that it is possible to adjust at least one of the following parameters, length of projecting part formed with the end of the wave guide, thickness thereof, and angle formed with the projecting part and the Z axis of the horn. Thus, a variation in the phase between the modes is possible in the area of the projecting part 9, thereby obviating any need to vary the operating frequency thereof, which was one factor accounting for the disadvantages of the prior art.

In FIGS. 6(*b*) to (*i*), there are shown different modifications in accordance with the invention having multiplex mode generating parts of different configuration, and such parts are shown as an iris typed projection in FIGS. 6(*b*), and (*i*), as a step projected in FIGS. 6(*c*) and (*h*); as an inner turned projection in FIG. 6(*d*); as an outer turned projection in FIG. 6(*e*), and as other modified projections in FIG. 6(*f*). In each case in accordance with the invention, it is possible to vary the angle formed with the projecting part 9 and the flaring part 3 in FIG. 6(*d*), (*e*), (*f*); a position or shape of the iris, groove, step in FIG. 6(*b*), (*c*), (*g*), (*h*), (*i*).

It is therefore, noted that in all of those embodiments, side lobe level may be decerased and change of the base difference in every mode of multiplex mode may be compensable so as to provide an improved horn antenna having low side lobe level, low transmission loss over a broader operating frequency band. Furthermore, it is easy to design the multiplex mode generating part and phase compensable part so that the mode generating part is formed at the end of the wave guide.

FIG. 7 shows a horn structure having a flaring part 3 which is slidable along the outside of a wave guide part 1′ so as to adjust the length of the projecting part 9 formed with the end part of the wave guide. Therefore, adjusting the parameter above mentioned, is easily possible to generate a suitable multiplex mode containing the $TM_{11}{}^0$, $TE_{12}{}^0$, and $TM_{12}{}^0$ mode components having optimum phase difference relations to each other thereby providing an axially symmetrical radiation pattern resulting in low side lobe level.

Furthermore, a space section 10 formed with the projection 9 and the flaring part 3 of the horn 2 provides a reactance or impedance compensable effect so that the flaring part may compose an equivalent circuit connected in parallel with an impedance in the mode generating part. In other words, in contrast to prior art arrangements, since the space section 10 adjusts the impedance characteristics according to the operating frequency, the multiplex mode generating part is not fixed. It is, therefore, emphasized that the reactance or impedance compensable effect can be useful for suppressing the changes of the phase difference in each mode according to operating frequency and for keeping the phase difference in the optimum relation. According to inventor's experiment, the frequency band width defined before in accordance with the invention may be obtained as less than 32 to more than 38 gHz. with the horn. Such configuration as the total flare angle $2\alpha=15°$ the aperture diameter $D_h=80$ mm., the exciting waveguide diameter $D_w=9.3$ mm., the outer diameter of the projecting part $D_p=12.3$ mm. and its length $L_p=16.5$ mm.

Referring now to FIG. 8, there is shown a schematic side view of a Cassegrain antenna having a horn 2 formed in accordance with the invention, subsidiary reflector 11 cooperates with a main parabolic reflector 12 and the horn 2. In operation, since the reflector 11 is located at the focus of the parabolic reflector 12, the electromagnetic wave fed by the horn 2, which is located near the center of the main reflector 12, is radiated through the subsidiary reflector 11 and the main reflector 12 to outer space, as shown at 13, 14 and 15 in FIG. 8.

As mentioned above, it should be noted that the Cassegrain antenna with the horn in accordance with the invention provides a high efficiency antenna having low side lobe level, and low noise temperature over wider operating frequency.

While the discussion of antennas in accordance with this invention has been directed namely toward the conical type horn, antenna, the principles of the invention are equally applicable to a rectangular horn, a pyramidal horn, or horn reflector etc. It should also be appreciated that although the invention has been described in connection with constructions shown in FIGS. 6 and 7, it is also applicable to an antenna having suitable design chosen with respect to the operating frequency, objection for use, and convenience of manufacture. It is furthermore possible to mount a protective device for the space 10, as reactance compensating part, from rain, snow, dust and the like.

While there has hereinbefore been presented what are at present considered to be the preferred embodiment of the invention, it will be apparent to those of ordinary skill in the art that many modifications and changes may be thereto made without departing from the true spirit and scope of the invention. It will be considered, therefore, that all those changes and modifications which fall fairly within the scope of the invention shall be a part of the invention.

What is claimed is:

1. An electromagnetic horn antenna comprising:

a cylindrical wave guide for carrying and exciting electromagnetic wave;

an electromagnetic horn having a throat part and a flaring part diverging from the throat part;

multiplex electromagnetic mode generating means formed by a cylindrical projection part of the wave guide, said projection part extending into the throat part of the horn for generating multiplex modes in the electromagnetic wave carried by the wave guide; and phase control and impedance compensable means formed by a coupling between the projection part of the wave guide and the throat part of the horn with a conical diverging face therebetween for selectively adjusting the phase between several modes introduced into said horn.

2. An electromagnetic horn antenna according to claim 1, wherein said phase control and impedance compensable means include a slidable coupling between said throat part and the projection part for adjustment of the actual position of the projection part with respect to said horn.

3. An electromagnetic horn antenna according to claim 1, wherein one end of said projection part is annular and the throat part of said wave guide is connected to the outer periphery of said projection part.

4. An electromagnetic horn antenna according to claim 1, wherein said projection part comprises an extension of said wave guide.

5. An electromagnetic horn antenna according to claim 1, wherein said projection part is provided with a transverse extension.

6. An electromagnetic horn antenna according to claim 5, wherein said transverse extension comprises a lateral extension.

7. An electromagnetic horn antenna according to claim 5, wherein said transverse extension comprises an annular projection directed toward the axis of the projection part.

8. An electromagnetic horn antenna according to claim 1, wherein said projection part is an annular member having an internal annular groove.

9. An electromagnetic horn antenna according to claim 1, wherein said projection part is an annular member and has a step-like cross-section.

10. An electromagnetic horn antenna according to claim 1, wherein the surface of said projection part extends into said horn at an angle to the axis thereof.

11. An electromagnetic horn antenna according to claim 1, wherein said projection part is an extension of said wave guide and said horn is slidably coupled to said wave guide so as to selectively adjust the degree of the extension of said projection part into said throat part of said horn.

References Cited

UNITED STATES PATENTS

| | | | |
|---|---|---|---|
| 3,274,602 | 9/1966 | Randall et al. | 343—786 X |
| 3,274,604 | 9/1966 | Lewis | 343—786 |
| 3,324,423 | 6/1967 | Webb | 343—786 X |
| 3,413,641 | 11/1968 | Turrin | 343—786 X |
| 3,423,756 | 1/1969 | Foldes | 343—786 X |

ELI LIEBERMAN, Primary Examiner

T. J. VEZEAU, Assistant Examiner